United States Patent
Hannu et al.

(10) Patent No.: US 9,521,700 B2
(45) Date of Patent: Dec. 13, 2016

(54) CONTROLLING RADIO CONNECTION STATES

(75) Inventors: Hans Hannu, Luleå (SE); Jan Christoffersson, Luleå (SE)

(73) Assignee: TELEFONAKTIEBOLAGET L M ERICSSON, Stockholm (SE)

(*) Notice: Subject to any disclaimer, the term of this patent is extended or adjusted under 35 U.S.C. 154(b) by 155 days.

(21) Appl. No.: 14/379,999

(22) PCT Filed: Feb. 22, 2012

(86) PCT No.: PCT/SE2012/050191
§ 371 (c)(1),
(2), (4) Date: Aug. 20, 2014

(87) PCT Pub. No.: WO2013/125990
PCT Pub. Date: Aug. 29, 2013

(65) Prior Publication Data
US 2015/0043460 A1 Feb. 12, 2015

(51) Int. Cl.
*H04W 76/04* (2009.01)
*H04W 52/02* (2009.01)

(52) U.S. Cl.
CPC ....... *H04W 76/046* (2013.01); *H04W 52/0216* (2013.01)

(58) Field of Classification Search
CPC .................. H04W 76/046; H04W 52/0216
See application file for complete search history.

(56) References Cited

U.S. PATENT DOCUMENTS

| | | | |
|---|---|---|---|
| 8,699,441 | B2 | 4/2014 | Stjernholm et al. |
| 2003/0143959 | A1 | 7/2003 | Harris et al. |
| 2006/0052137 | A1* | 3/2006 | Randall ............... H04W 72/048 455/560 |
| 2011/0319064 | A1 | 12/2011 | Lenart et al. |
| 2012/0122405 | A1* | 5/2012 | Gerber ................. H04W 56/00 455/67.11 |

FOREIGN PATENT DOCUMENTS

EP 2355610 A1 8/2011

OTHER PUBLICATIONS

3GPP, "3rd Generation Partnership Project; Technical Specification Group Radio Access Network; Radio Resource Control (RRC); Protocol specification (Release 10)", 3GPP TS 25.331 V10.4.0, Jun. 2011, 1-1879.

(Continued)

*Primary Examiner* — Mohammad Anwar
(74) *Attorney, Agent, or Firm* — Patents on Demand, P.A.; Brian K. Buchheit; Scott M. Garrett

(57) ABSTRACT

Control of transitions between radio resource control, RRC, states for a wireless terminal in a radio access network is described. The radio resource control states comprise a first state and a second state. A calculation (702) is made of a prediction of an inter-arrival time, ITB, between data bursts to be handled. A detection (704) that a data burst is to be handled is done and then it is decided (706) whether to make a transition from the first state to the second state essentially immediately and upon termination of handling of the detected data burst if the prediction of the ITB is greater than a current ITB threshold. The current ITB threshold is a time interval that is depending on a function of RRC state transition costs and the fractional distribution of true predictions and false predictions of a plurality of predicted ITB values in relation to recorded ITB values. Then, in accordance with the decision, the wireless terminal is directed (708) either to remain in the first state or switch to the second state.

21 Claims, 5 Drawing Sheets

(56) References Cited

OTHER PUBLICATIONS

Feng Qian et al, TOP: Tail Optimization Protocol for Cellular Radio Resource Allocation, Network Protocols (ICNP), 2010 18th IEEE International Conference, Oct. 2010, pp. 285-294, IEEE.
Yeh, Jui-Hung et al., "Performance Analysis of Energy Consumption in 3GPP Networks", Wireless Telecommunications Symposium, May 14-15, 2004, pp. 67-72.

* cited by examiner

CONTROLLING RADIO CONNECTION STATES

TECHNICAL FIELD

The field of the present disclosure is that of controlling transitions of radio resource control, RRC, states for a user equipment, UE, in a cellular radio communication system.

BACKGROUND

Mobile telecommunications systems are normally statically configured with a parameter set defining the behavior of the system. The systems are based on standards which define radio bearers to carry traffic with different characteristics, e.g. speech, streaming video, or packet data. Standards such as the 3rd generation partnership project, 3GPP, standards define different so-called user equipment/radio resource control, UE/RRC, states. See, for example, 3GPP TS 25.331 V10.4.0 (2011-06), 3rd Generation Partnership Project; Technical Specification Group Radio Access Network; Radio Resource Control, RRC, Protocol specification (Release 10), which describes states such as CELL_DCH state, CELL_FACH state, CELL_PCH state, URA_PCH state, and the Idle state URA_PCH state. These names of these states are understood in view of the following channels/areas: Dedicated Channel, DCH, Forward Access Channel, FACH, Random Access Channel, RACH, and UTRAN registration area, URA_PCH.

For each wireless terminal in the connected mode, a node of the radio access network, such as a radio network controller, RNC, determines in which of these states the wireless terminal operates. Whichever of the UE/RRC states a wireless terminal currently is in has consequences which affect, e.g., the UE battery consumption and the resource consumption in the mobile network.

Packet data services have escalated, particularly with the introduction of wireless terminals in the form of devices such as smartphones, and with personal computers now widely participating in the mobile networks. Most of the packet traffic is based on the internet protocol, IP, e.g., internet services, and is normally treated as best effort traffic in the mobile network. Internet services are of many types and different characteristics, e.g. web browsing, chat, email, file sharing, and video streaming.

Within an IP flow there are typically times of activity and times of inactivity. Periods of activity will be separated by times of inactivity of different length. Within the IP flow, a burst may for example be defined by IP packets arriving with a an idle time between bursts, ITB, defined as the time between the last packet in one burst and the first packet of the next as illustrated in FIG. 1.

As mentioned above, a radio access network node such as the RNC keeps track of the UE/RRC state in which a wireless terminal is currently operating and also governs the transition of the wireless terminal between UE/RRC states. In other words, the RNC determines when a wireless terminal should transition from one UE/RRC state to another state. Parameters to govern the transition between UE/RRC states are normally timer based. FIG. 2 generally depicts that, when switching to a higher state, a wireless terminal may be required to transition from one UE/RRC state to another UE/RRC state upon expiration of a timer. The timer may be activated or initiated by some UE-related network activity, e.g. forwarding of an IP packet to/from the UE. The timer may expire due to some UE-related inactivity, e.g., no IP packet forwarded to/from the UE. Expiration of the timer may prompt the transition from one UE/RRC state to another UE/RRC state. Transfer to a state of higher activity is normally transmission-triggered, e.g., filling of a buffer.

High Speed Packet Access, HSPA, generally employs two mobile telephony protocols, High Speed Downlink Packet Access, HSDPA, and High Speed Uplink Packet Access, HSUPA, and as such extends and improves the performance of existing protocols. With HSPA it is now possible to provide mobile broadband since the peak bit rates reach up to 42 Mbps (3GPP R8) in downlink, and 11 Mbps (3GPP R8) in uplink. For 3GPP R9 the peak rates are doubled. Thus, HSPA may be seen as a complement and replacement to other broad band access such as Asymmetric Digital Subscriber Line, ADSL.

As mentioned above and illustrated in FIG. 3, the Idle, Cell_DCH, Cell_FACH, URA_PCH, and Cell_PCH are the five RRC protocol states. Data transfer between the UE and the network is only possible in Cell_FACH and Cell_DCH states. The Cell_DCH state is characterized by dedicated channels in both the uplink and the downlink. This corresponds to continuous transmission and reception and has the highest battery consumption. The Cell_FACH state does not use dedicated channels and thus allows lower battery consumption, at the expense of a lower uplink and downlink throughput. Thus, in addition to showing the RRC states, FIG. 3 also shows serves as an example state transition diagram. As understood from FIG. 3, the system typically does state transition due to amount of data in the RLC send buffers and due to the length of transmission inactivity.

In the example state transition diagram of FIG. 3, down-switch from CELL_DCH is based on inactivity timers. These may be set differently depending on traffic types, based on RNC load, with respect to UE power consumption or even specifically per user. A different approach is to use adaptive channel switching by predicting the time until the next data activity, i.e. to predict the IdleTime Between data bursts, ITB.

There is a difference in processor cost for an RNC associated with staying in the different states and to switch between the states. The cost is related to hardware resource consumption with respect to memory and implied processor load for a certain event, such a state channel switching event. The cost of residing in CELL_DCH may be approximately 10000 times that of staying in one of the lower states, e.g. CELL_FACH or URA_PCH. Hence from the RNC perspective, it is most efficient to avoid CELL_DCH except when needed due to requirements on data transmission rate. However, since there is also a processor cost associated with switching, down-switching is not economical unless the UE may stay in the lower state for a certain time (depending on the specific RNC load implication).

A different approach to use down-switch a timer is to use traffic adaptive channel switching, TACS. TACS involves predicting the time until the next data activity, i.e. to predict the ITB by using a prediction algorithm. If a short ITB is predicted, the user should stay on DCH while if a long ITB is predicted, the user should be down-switched to URA_PCH. The limit which discriminates between short and long ITBs is the ITB threshold, $ITB_{THR}$. Typically, this threshold is larger than the fixed down-switch timer which also leads to better user experience when TACS is used. Examples of adaptive channel switching are described, e.g., in U.S. provisional patent application 61/544,205, filed Oct. 6, 2011, entitled "DYNAMIC RADIO RESOURCE CONTROL STATE SWITCHING".

The $ITB_{THR}$ defined in the TACS approach is the time interval at which the cost of remaining in the first state is equal to the cost of switching to the second state and switching back to the first state. Although this definition may appear optimal, it suffers from being sub-optimal in reality since the ITB predictions are subject to errors. If $ITB_{THR}$ is too small, there is no gain from doing a switch to the second state for ITBs which are just above $ITB_{THR}$, while if $ITB_{THR}$ is too large, there is no gain from remaining in the first state for ITBs which are just below $ITB_{THR}$.

SUMMARY

In order to mitigate at least some of the drawbacks as discussed above, there is provided in a first aspect a method in a node for controlling transitions between radio resource control, RRC, states for a wireless terminal in a radio access network. The radio resource control states comprise a first state and a second state. The method comprises a calculation of a prediction of an inter-arrival time, ITB, between data bursts to be handled. A detection that a data burst is to be handled is done and then it is decided whether to make a transition from the first state to the second state essentially immediately and upon termination of handling of the detected data burst if the prediction of the ITB is greater than a current ITB threshold. The current ITB threshold is a time interval that is depending on a function of RRC state transition costs and the fractional distribution of true predictions and false predictions of a plurality of predicted ITB values in relation to recorded ITB values. Then, in accordance with the decision, the wireless terminal is directed either to remain in the first state or switch to the second state.

That is, a method for deriving an optimal ITB threshold is provided. The method enables, for example, improvement on the gains in terms of RNC cost which are possible when using traffic adaptive channel switching. This is due to the fact that the method incorporates the performance of the prediction algorithm, in terms of the fractional distribution of true and false predictions of ITB values in relation to recorded ITB values, into the derivation of the ITB threshold. The reason for this is that all prediction algorithms are subject to erroneous predictions which impact the optimal setting of the ITB threshold.

Furthermore, such a method can enable derivation of optimal switching thresholds also for other reasons than minimizing the RNC cost. For example, UE battery consumption is one aspect which can be optimized assuming that a feasible cost function is used.

The calculation of a prediction of an ITB can comprise calculation of a predicted time interval or calculation of a predicted logical value that indicates whether an ITB is longer or shorter than the current ITB threshold.

In other words, embodiments of the method can utilize more or less complex prediction algorithms. This provides an enhanced flexibility when implementing the method.

The current ITB threshold can have a value that minimizes a sum of an average RRC state transition cost for predicted ITB values that are shorter than the current ITB threshold and an average RRC state transition cost for predicted ITB values that are longer than the current ITB threshold.

That is, the function of the RRC state transition costs is combined with the performance of the prediction algorithm in a minimization calculation.

In such a case, the average RRC state transition cost for predicted ITB values that are shorter than the current ITB threshold can be proportional to the fraction of short predictions that are correct and proportional to the fraction of short predictions that are false, and the average RRC state transition cost for predicted ITB values that are longer than the current ITB threshold can be proportional to the fraction of long predictions that are correct and proportional to the fraction of long predictions that are false.

The calculation of an updated value for the current ITB threshold can be performed at regular instants in time, the instants in time being defined by any of a specific number of recorded ITB values and a specific number of seconds. Moreover, the instants in time can also be determined in dependence of an analysis of content of the data bursts. During such a loop, a calculation can be done of at least one updated value for an RRC state transition cost.

In other words, the ITB threshold can be continuously updated. This has the effect in that an optimum ITB threshold can be maintained during changing data traffic conditions.

The calculation of a prediction of an ITB between data bursts to be handled can comprise calculation of a prediction of an ITB between data bursts to be transmitted from the node to the wireless terminal or an ITB between data bursts to be received from the wireless terminal. Consequently, the detection that a data burst is to be handled can comprise detection that a data burst is to be transmitted from the node to the wireless terminal or a detection that a data burst is to be received from the wireless terminal.

In other words, the method can be utilized in relation to uplink data traffic as well in relation to downlink data traffic.

In a second aspect there is provided a node for controlling transitions between radio resource control, RRC, states for a wireless terminal in a radio access network. The radio resource control states comprise a first state and a second state. The node comprises communication and control circuitry configured to calculate a prediction of an inter-arrival time, ITB, between data bursts to be handled. The communication and control circuitry is further configured to detect that a data burst is to be handled and configured to decide whether to make a transition from the first state to the second state essentially immediately and upon termination of handling of the detected data burst if the prediction of the ITB is greater than a current ITB threshold. The current ITB threshold is a time interval that is depending on a function of RRC state transition costs and the fractional distribution of true predictions and false predictions of a plurality of predicted ITB values in relation to recorded ITB values. The communication and control circuitry is further configured to, in accordance with the decision, direct the wireless terminal either to remain in the first state or switch to the second state.

In a third aspect there is provided a computer program product comprising software instructions that are configured, when executed in a processing device, to perform the method of the first aspect.

The effects and advantages of the second aspect and the third aspect correspond to those summarized above in connection with the first aspect.

DETAILED DESCRIPTION OF EMBODIMENTS

Figure 1:
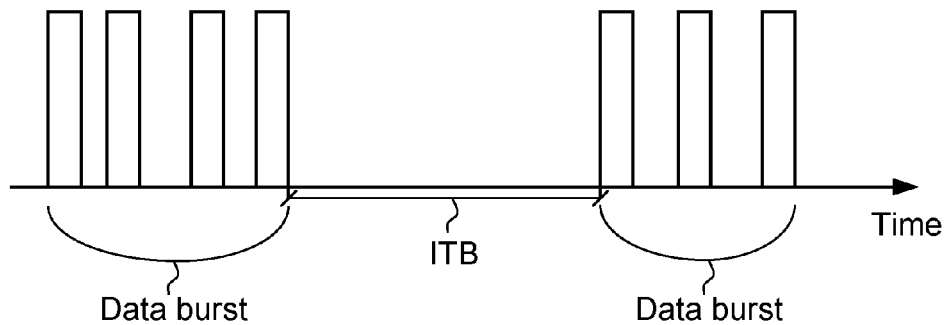
FIG. 1 illustrates schematically timing of data bursts and idle time between data bursts.
Figure 2:
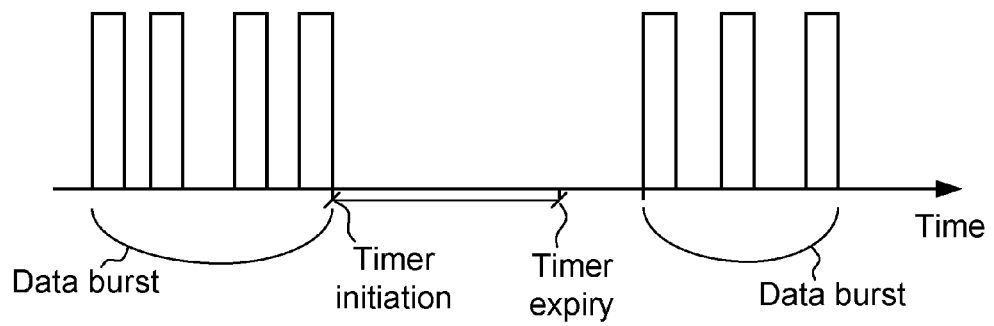
FIG. 2 illustrates schematically timing of data bursts and use of timers.
Figure 3:
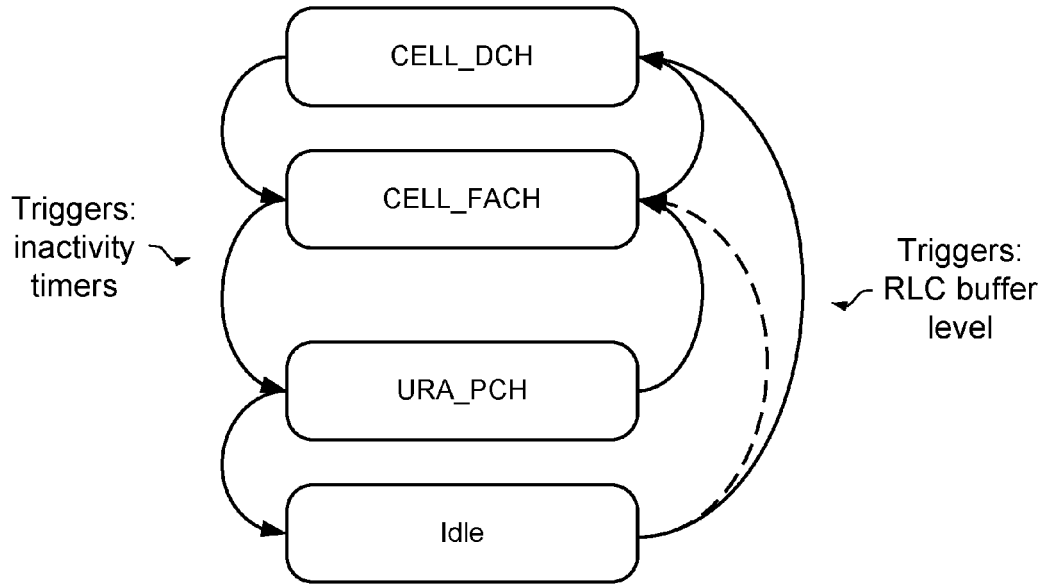
FIG. 3 illustrates schematically RRC state switching involving timers and buffer levels.
Figure 4:
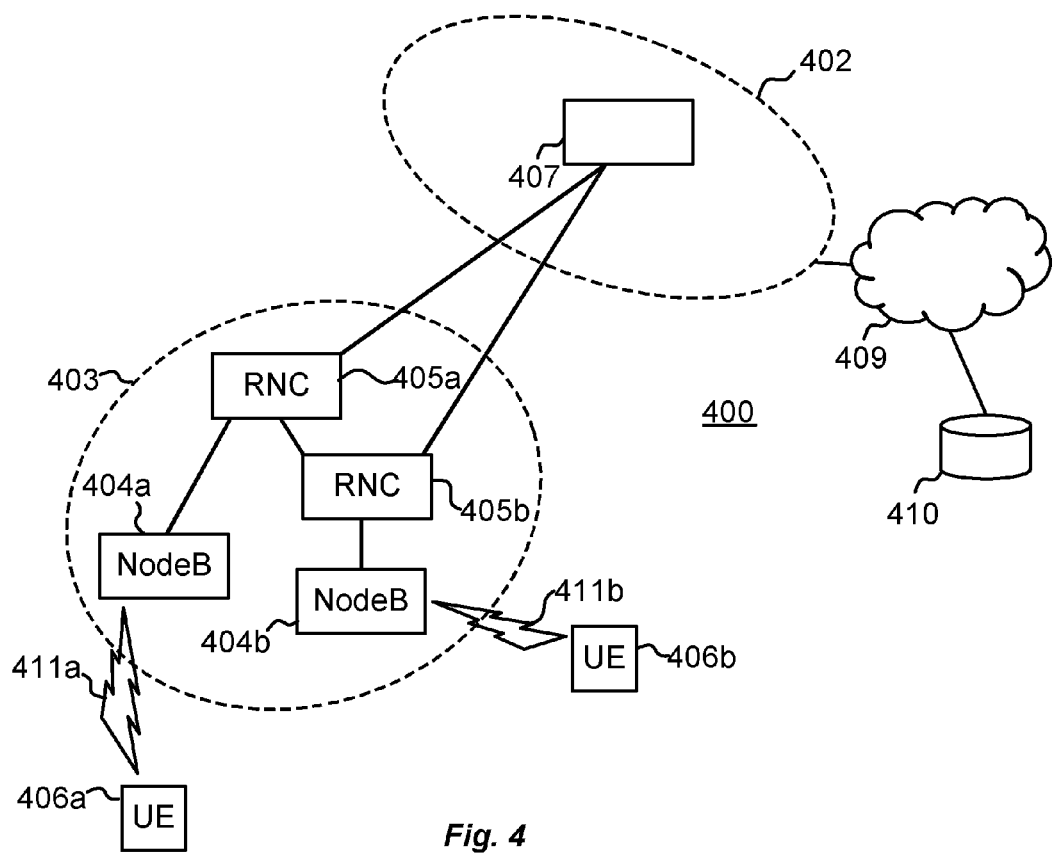
FIG. 4 illustrates schematically a mobile communication system.

FIG. 4 illustrates schematically a universal mobile telecommunications system, UMTS, network 100 in which the present methods and apparatuses can be implemented. It should be noted, however, that the skilled person will readily be able to perform implementations in other similar communication systems involving transmission of coded data between nodes.

In FIG. 4 the UMTS network 400 comprises a core network 402 and a UMTS terrestrial radio access network, UTRAN, 403. The UTRAN 403 comprises a number of nodes in the form of radio network controllers, RNC, 405a, 405b, each of which is coupled to a set of neighbouring nodes in the form of one or more NodeB 404a, 404b. Each NodeB 404 is responsible for a given geographical radio cell and the controlling RNC 405 is responsible for routing user and signalling data between that NodeB 404 and the core network 402. All of the RNC's 405 are coupled to one another. A general outline of the UTRAN 403 is given in 3GPP technical specification TS 25.401 V3.2.0.

FIG. 4 also illustrates communicating entities in the form of mobile devices or user equipment, UE, 406a, 406b connected to a respective NodeB 404a, 404b in the UTRAN 403 via a respective air interface 411a, 411b. Mobile devices served by one Node B, such as UE 406a served by NodeB 404a, are located in a so-called radio cell. The core network 402 comprises a number of nodes represented by node 407 and provides communication services to the UE 406 via the UTRAN 403, for example when communicating with the Internet 409 where, schematically, a server 410 illustrates an entity with which the mobile devices 406 may communicate. As the skilled person realizes, the network 400 in FIG. 4 may comprise a large number of similar functional units in the core network 402 and the UTRAN 403, and in typical realizations of networks, the number of mobile devices may be very large.

Furthermore, as discussed herein, communication between the nodes in the UTRAN 403 and the mobile devices 406 may follow the protocols as specified by 3GPP HSPA specifications.

Figure 5:
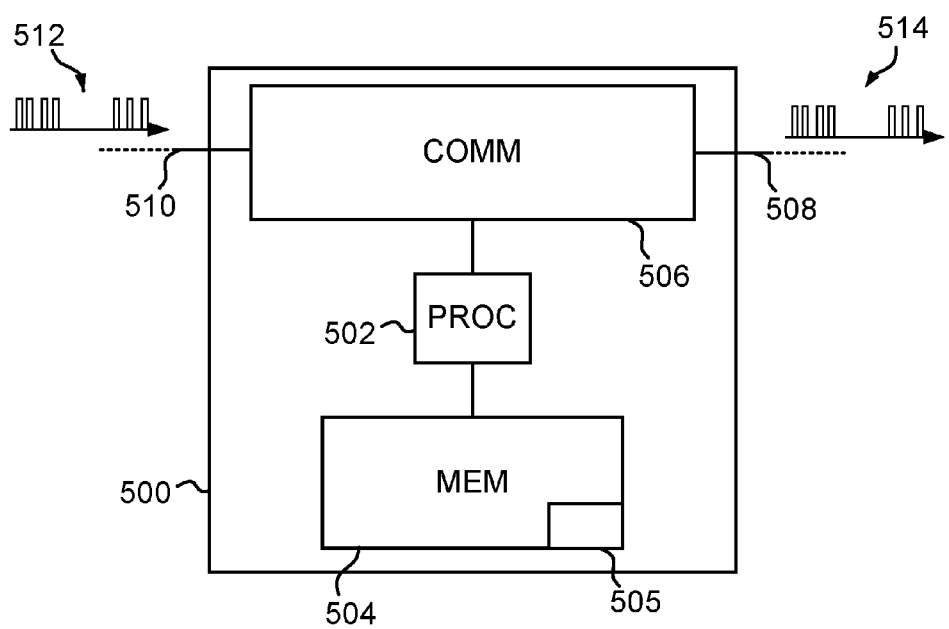
FIG. 5 illustrates schematically a node in a mobile communication system.

FIG. 5 is a functional block diagram that schematically illustrates a node 500 that is configured to operate in a radio access network, such as the UTRAN 403 in FIG. 4. In the embodiment of FIG. 5, the node 500 represents a RNC, such as any of the RNC's 405 in FIG. 4.

The node 500 comprises processing means, memory means and communication means in the form of a processor 502, a memory 504 and communication circuitry 506. The node 500 receives data bursts 512 via an incoming data path 510 and transmits data bursts 514 via an outgoing data path 508. The data paths 510, 512 can be any of uplink and downlink data paths, as the skilled person will realize.

The methods to be described below can be implemented in the node 500. In such embodiments, the method actions are realized by means of software instructions 505 that are stored in the memory 504 and are executable by the processor 502. Such software instructions 505 can be realized and provided to the node in any suitable way, e.g. provided via the networks 402, 403 or being installed during manufacturing, as the skilled person will realize. Moreover, the memory 504, the processor 502, as well as the communication circuitry 506 comprise software and/or firmware that, in addition to being configured such that it is capable of implementing the methods to be described, is configured to control the general operation of the node 500 when operating in a cellular mobile communication system such as the system 400 in FIG. 4. However, for the purpose of avoiding unnecessary detail, no further description will be made in the present disclosure regarding this general operation.

Figure 6:
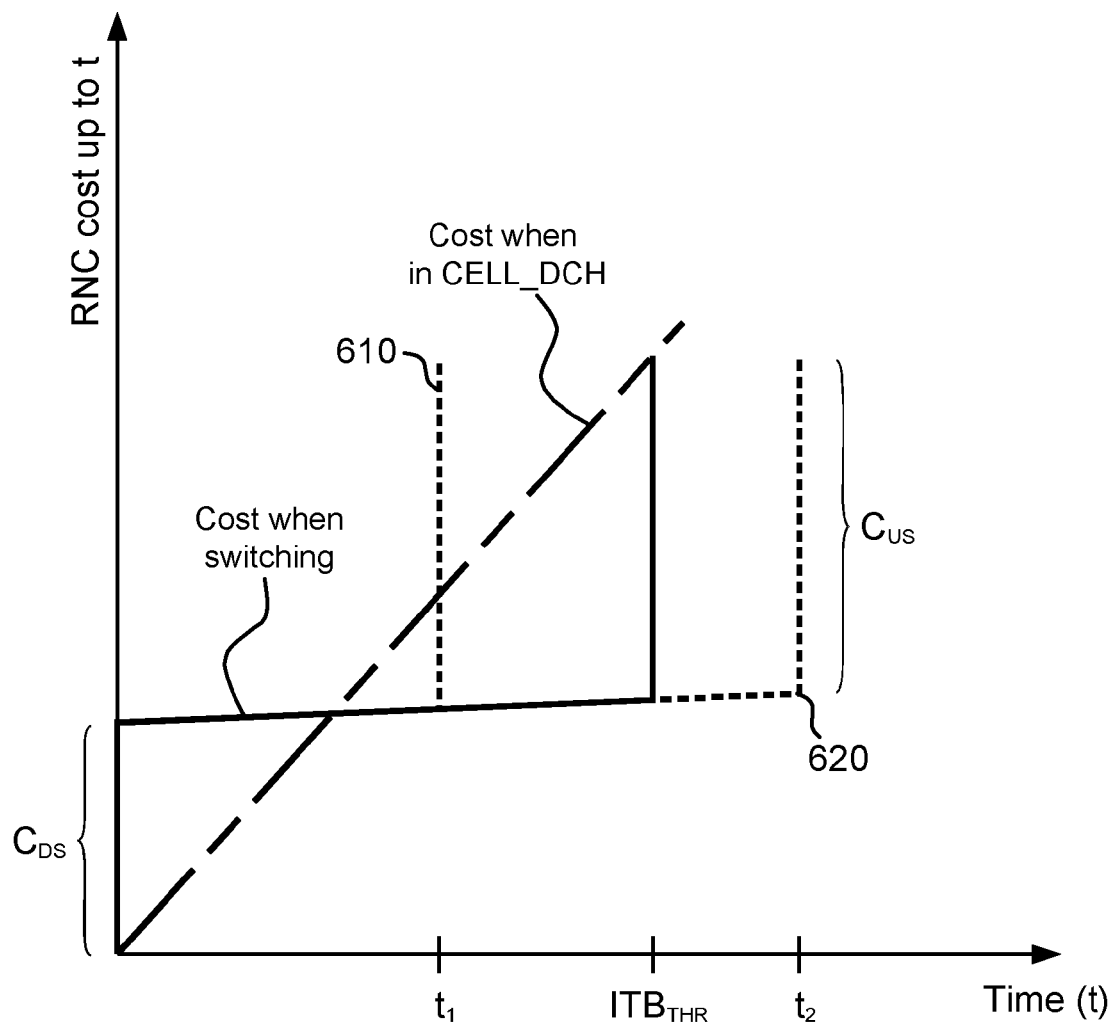
FIG. 6 is a graph that schematically illustrates costs related to RRC state transitions.
Figure 7:
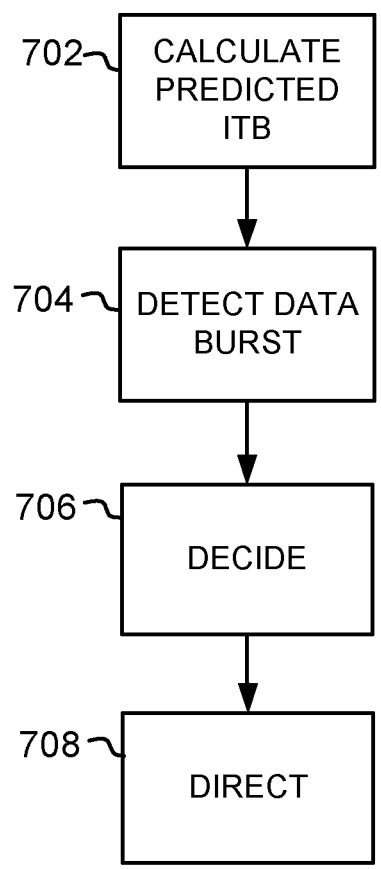
FIG. 7 is a flow chart of a first embodiment of a method for controlling RRC state transitions.
Figure 8:
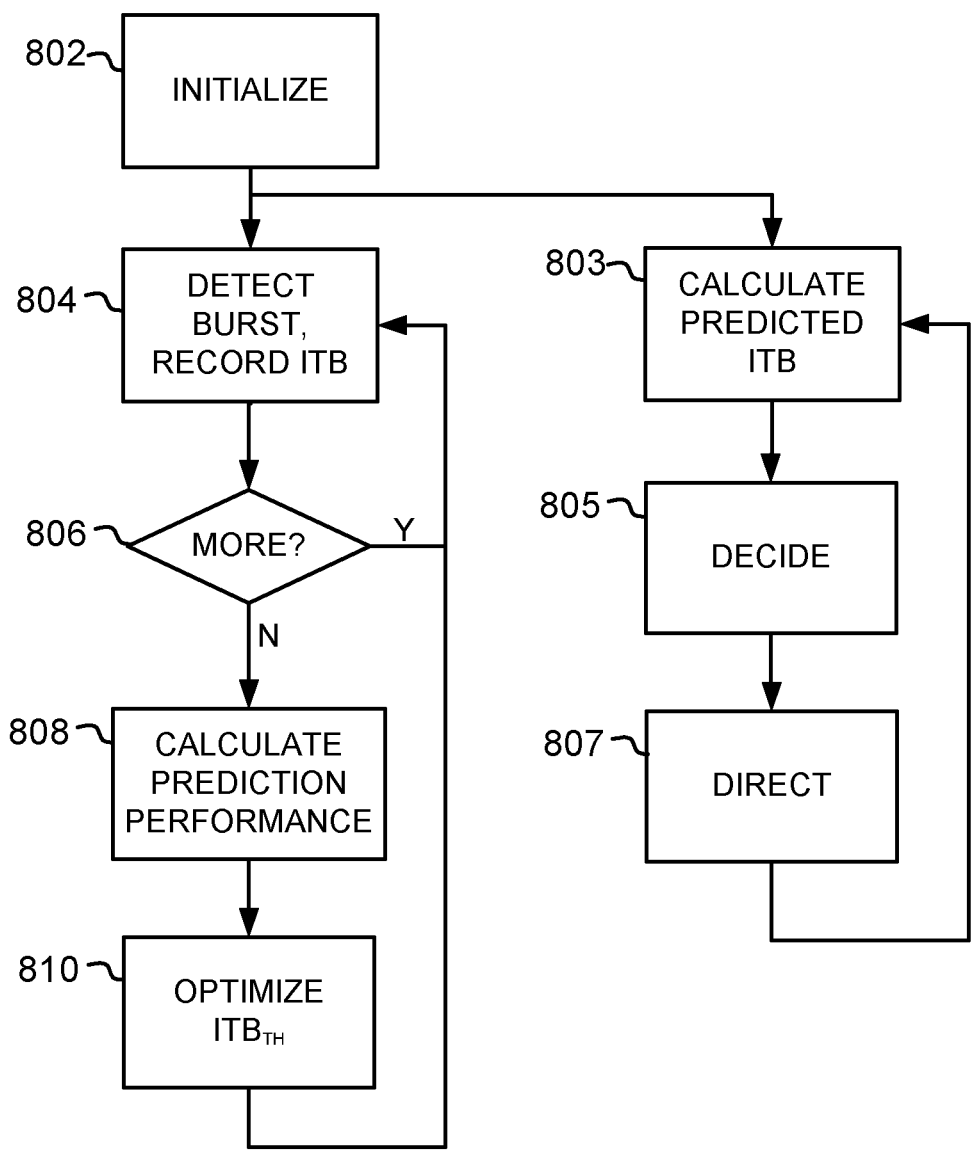
FIG. 8 is a flow chart of a second embodiment of a method for controlling RRC state transitions.

Turning now to FIGS. 6 to 8, and with occasional reference to FIGS. 1 to 5, methods relating to control of transitions between RRC states will be described in some detail. As indicated above, the $ITB_{THR}$ defined in the TACS approach is the time interval at which the cost of remaining in a first RRC state is equal to the cost of switching to a second RRC state. Although this definition may appear optimal, it suffers from being sub-optimal in reality since the ITB predictions are subject to errors. If $ITB_{THR}$ is too small, there is no gain from doing a switch to the second state for ITBs which are just above $ITB_{THR}$, while if $ITB_{THR}$ is too large, there is no gain from remaining in the first state for ITBs which are just below $ITB_{THR}$.

As in the TACS approach, a straightforward way to determine $ITB_{THR}$ is according to the following equation:

$$[C_{DS}+C_{US}]=C_{DCH}*ITB_{THR} \quad (1)$$

where $C_{DS}$, $C_{US}$ and $C_{DCH}$ are the costs for down-switch, up-switch and residing in CELL_DCH, respectively. It is assumed (approximated) that the cost for residing in URA_PCH is zero. Equation (1) balances the costs so that the cost of down-switching to URA_PCH and up-switch again yields the same cost as staying on CELL_DCH for ITBs that are equal to the $ITB_{THR}$. Hence, if an ITB is shorter than $ITB_{THR}$, it costs less to stay on CELL_DCH while if the ITB is longer than $ITB_{THR}$, it costs less to down-switch to URA_PCH. The resulting costs for either staying on CELL_DCH or down switching to URA_PCH are illustrated in FIG. 6. In FIG. 6, the dashed line 610 shows that the cost for down switching is higher than if staying in CELL DCH (short dash-long dash line) if transmission takes place at $t_1$. If the next transmission is at $t=ITB_{THR}$, the solid line shows that the costs are equal irrespective of switching while the dashed line 620 show that the cost is higher if staying on CELL_DCH if the next transmission is at $t_2$.

With the above in mind, it is hence desirable to derive an optimal value for $ITB_{THR}$ when the ITB predictions are subject to prediction errors. This is made possible by including the prediction performance and possibly also the user behavior into the derivation of $ITB_{THR}$.

The erroneous predictions will result in costs that are higher than those that are expected according to equation (1). For example, false short predictions will cause the user to stay in CELL_DCH until $ITB_{THR}$ and then do a down-switch. The extra cost for this is proportional to $C_{DCH}*ITB_{THR}$. Hence, by reducing $ITB_{THR}$, the cost for this type of errors is reduced. For false long predictions, the extra cost is proportional to $C_{DS}+C_{US}$, which only has a slight dependence on $ITB_{THR}$, in case the fraction of false long predictions changes when the $ITB_{THR}$ is altered.

From the above, it is reasonable that reducing $ITB_{THR}$ compared to what is given by equation (1) will give better performance, i.e. a lower total cost. To calculate more exactly how much to alter $ITB_{THR}$, the performance of the prediction algorithm is calculated in terms of the fractional distribution of false and true predictions of ITB values. That is, the fraction of false short predictions, FN, and the fraction of false long predictions, FP, is calculated and used to calculate an optimal value for $ITB_{THR}$.

The calculated $ITB_{THR}$ value can then be used in an embodiment of a method in a node, e.g. a RNC as exemplified above, for controlling transitions between RRC states for a wireless terminal, e.g. a UE. Such a method is illustrated in FIG. 7. It is assumed that the RRC states in which the node and the wireless terminal can be is a first state and a second state and that the node and the wireless terminal is in the first state when the method commences.

With specific reference to the flow chart in FIG. 7, the method commences with a prediction step 702 in which a prediction algorithm is used to calculate a prediction of an ITB between data bursts to be handled. It is to be noted that this embodiment, as well as other embodiments described herein, make use of an appropriate prediction algorithm to calculate the ITB predictions. One example of a prediction algorithm is a tree classifier such as the J48 algorithm. Other examples include discriminate analysis and logistic regression.

Detection is made, in a detection step 704, that a data burst is to be handled by the node. For example, the data burst can be a burst that originates in a UE and is intended for a node in the uplink direction. The handling of the data burst will in such a case comprise transmission of data in the uplink direction. The data burst can also be a burst that originates in a node in the network and is intended for a UE in the downlink direction. The handling of the data burst will in such a case comprise transmission of data in the downlink direction. The detection that a data burst is to be handled is typically a process that keeps track of data burst arrival time information, and thereby records ITB values for the data bursts.

A decision is then made, in a decision step 706, whether to make a transition from the first state to the second state essentially immediately and upon termination of handling of the detected data burst if the prediction of the ITB is greater than a current $ITB_{THR}$. As discussed above, the current $ITB_{THR}$ is a time interval that is depending on the fractional distribution of true predictions and false predictions of a plurality of predicted ITB values in relation to recorded ITB values.

In a direction step 708, the wireless terminal is then directed either to remain in the first state or switch to the second state in accordance with the decision that was made in the decision step 706.

Turning now to FIG. 8, a more detailed example will be described of how an optimized value for $ITB_{THR}$ can be used in a network node for controlling transitions between RRC states for a wireless terminal, i.e. a UE. As indicated in FIG. 8, a prediction step 803, a decision step 805 and a direction step 807 are performed concurrently with method steps 804-810 that provide a continuously updated and optimized value for $ITB_{THR}$. The prediction step 803, the decision step 805 and the direction step 807 correspond to the prediction step 702, the handling of data bursts in decision step 706 and the direction step 708 described above in connection with FIG. 7. In fact, the method illustrated in the flow chart of FIG. 8 can be seen as a more detailed example of how the method of FIG. 7 can be realized.

The method commences with an initialization step 802, which is triggered by the fact that the UE is entering into contact with a radio cell in a cellular wireless network in which the node is operating. Details regarding the triggering events are outside the scope of the present disclosure.

In the initialization step 802, initial settings for a selected ITB prediction algorithm are done. These settings include the selection of prediction algorithm, including operational parameters specific to the prediction algorithm, to be used and an initial $ITB_{THR}$ setting. For example, the settings can be unique for the UE, specific for the radio cell or geographical area, time of day or based on an application that is running in the UE. However, a simple "baseline" initialization can be to use one and the same ITB prediction algorithm and $ITB_{THR}$ for all UEs.

Data bursts and associated ITB values are detected and recorded in a recording step 804 and in a decision step 806 it is decided whether or not enough time has been spent recording the ITB values. For example, this decision can be based on specific time intervals (e.g. every minute, every 5 minutes etc.) or based on a number of recorded ITBs (e.g. every 100 ITBs, every 500 ITBs etc.). The decision can also be based on deep packet inspection, DPI, in respect of the data in the data bursts, to identify if new applications are being active in the UE or if other applications are not active in the UE anymore. The time at which enough time has been spent recording the ITB values can then be a time interval after the new application has started.

The ITB values that have been recorded are then used to calculate, in a calculation step 808, the performance of the predictions made with the prediction algorithm. The performance of the predictions is given by the fractional distribution of true predictions and false predictions of ITB values in relation to the recorded, i.e. true, ITB values.

The fractional distribution can be expressed by four values TN, FN, TP and FP. TN is the fraction true negative, i.e. the fraction of short predictions which are correct. FN is the fraction of false negative, i.e. the fraction of short predictions which are false (a long ITB is predicted to be short). Similarly, TP is the fraction of true positive, i.e. the fraction of long predictions which are correct. FP is the fraction of false positive, i.e. the fraction of long predictions which are false.

The fractional distribution of true predictions and false predictions of ITB values is then used in an optimization procedure 810 to obtain an optimized value of $ITB_{THR}$ as follows.

The average cost for short predictions is given by:

$$TN[E(ITB|S)*C_{DCH}]+FN[ITB_{THR}*C_{DCH}+C_{DS}+C_{US}] \quad (2)$$

where $E(ITB|S)$ is the expected (approximately the average) ITB length given that the ITB is shorter than $ITB_{THR}$.

The average cost for long predictions is given by:

$$TP[C_{DS}+C_{US}]+FP[C_{DS}+C_{US}] \quad (3)$$

Since the cost for remaining in the state URA_PCH is in the order of $\frac{1}{10000}$ of the cost for remaining in the state CELL_DCH, all terms in the cost equations (2) and (3) including this cost is assumed to be zero.

Several of the terms in (2) and (3) are dependent on the choice of $ITB_{THR}$. For example TP+FP will typically increase slightly if $ITB_{THR}$ is decreased. However, the increase is typically negligible due to the ITB distribution which typically is almost flat in the range of typical $ITB_{THR}$. Consequently TN+FN may see a small decrease when $ITB_{THR}$ is decreased. Also the other terms in equation (2), $E(ITB|S)$ and $ITB_{THR}*C_{DCH}$ will decrease if $ITB_{THR}$ is decreased. The term which dominates the change in (2) and (3) when $ITB_{THR}$ is decreased is $ITB_{THR}*C_{DCH}$. Hence, decreasing $ITB_{THR}$ will lead to an overall decrease in the total RNC cost, in comparison with the total cost when using a prior art TACS scheme, given by the sum of equations (2) and (3).

The optimal $ITB_{THR}$ is the value of $ITB_{THR}$ which will minimize the sum of equations (2) and (3). Unfortunately, since several of the terms in (2) and (3) are dependent on $ITB_{THR}$ it is very difficult to derive a closed form expression for how to choose $ITB_{THR}$ to minimize the sum. Hence, minimization of the sum of equations (2) and (3) is preferably done numerically.

A numerical minimization can, in a simple way, be done by iterating a calculation of the total cost, given by the sum of equations (2) and (3), while using a current iteration value of $ITB_{THR}$ that is reduced in each iteration by an appropriately large $\Delta$-value. The optimized value of $ITB_{THR}$ is then obtained as the one current iteration value of $ITB_{THR}$ for which the total cost is minimized.

The calculation of the optimized $ITB_{THR}$ in step 810 may also involve the use of continuously updated values for the cost function for switching states and residing in states, i.e. the values of $C_{DS}$, $C_{US}$, $C_{DCH}$, and $C_{URA}$, can be varying over time and system load.

The method then continues in the detection step 804 with the updated values, i.e. the optimized value of $ITB_{THR}$.

Although the method described above makes use of ITB prediction values that are in the form of time intervals, it is also possible to use prediction algorithms that generate output in the form of logical values that represent whether or not the an ITB is longer or shorter than a specified $ITB_{THR}$. In such a case, the calculation step 808 and the optimization procedure 810 are adapted to use each current value of $ITB_{THR}$, and for each of these values calculate TN, FN, TP and FP.

The invention claimed is:

1. A method in a node for controlling transitions between radio resource control (RRC) states for a wireless terminal in a radio access network, the radio resource control states comprising a first state and a second state, the method comprising:
    calculating a prediction of an inter-arrival time (ITB) between successive data bursts to be handled;
    detecting that a data burst is to be handled;
    deciding whether to make a transition from the first state to the second state upon termination of handling of the detected data burst if the prediction of the ITB is greater than a current ITB threshold, wherein
    the current ITB threshold is a time interval that is determined based on a fractional distribution of true predictions and false predictions made for a plurality of ITB values using a prediction algorithm in relation to ITB values recorded for the plurality of ITB values; and
    directing the wireless terminal either to remain in the first state or switch to the second state in accordance with the decision.

2. The method of claim 1, wherein the calculation of a prediction of an ITB comprises calculation of a predicted time interval.

3. The method of claim 1, wherein the calculation of a prediction of an ITB comprises calculating a predicted logical value that indicates whether an ITB is longer or shorter than the current ITB threshold.

4. The method of claim 1, wherein the current ITB threshold has a value that minimizes a sum of an average RRC state transition cost for predicted ITB values that are shorter than the current ITB threshold and an average RRC state transition cost for predicted ITB values that are longer than the current ITB threshold.

5. The method of claim 4, wherein:
    the average RRC state transition cost for predicted ITB values that are shorter than the current ITB threshold is proportional to the fraction of short predictions that are correct and proportional to the fraction of short predictions that are false, and
    the average RRC state transition cost for predicted ITB values that are longer than the current ITB threshold is proportional to the fraction of long predictions that are correct and proportional to the fraction of long predictions that are false.

6. The method of claim 1, comprising:
    calculating an updated value for the current ITB threshold at regular instants in time, the instants in time being defined by any of:
    a specific number of recorded ITB values,
    a specific number of seconds.

7. The method of claim 6, comprising:
    calculating at least one updated value for an RRC state transition cost.

8. The method of claim 1, comprising:
    calculating an updated value for the current ITB threshold at instants in time, the instants in time being determined in dependence of an analysis of content of the data bursts.

9. The method of claim 1, wherein:
    the calculation of a prediction of an ITB between data bursts to be handled comprises calculation of a prediction of an ITB between data bursts to be transmitted from the node to the wireless terminal, and
    the detection that a data burst is to be handled comprises detection that a data burst is to be transmitted from the node to the wireless terminal.

10. The method of claim 1, wherein:
    the calculation of a prediction of an ITB between data bursts to be handled comprises calculation of a prediction of an ITB between data bursts to be received from the wireless terminal, and
    the detection that a data burst is to be handled comprises detection that a data burst is to be received from the wireless terminal.

11. A node for controlling transitions between radio resource control (RRC) states for a wireless terminal in a radio access network, the radio resource control states comprising a first state and a second state, the node comprising a communication and control circuitry configured to:
    calculate a prediction of an inter-arrival time (ITB) between successive data bursts to be handled,
    detect that a data burst is to be handled,
    decide whether to make a transition from the first state to the second state upon termination of handling of the detected data burst if the prediction of the ITB is greater than a current ITB threshold, wherein
    the current ITB threshold is a time interval that is determined based on a fractional distribution of true predictions and false predictions made for a plurality of ITB values using a prediction algorithm in relation to ITB values recorded for the plurality of ITB values, and
    direct the wireless terminal either to remain in the first state or switch to the second state in accordance with the decision.

12. The node of claim 11, where the communication and control circuitry configured to calculate a prediction of an ITB are further configured to calculate a predicted time interval.

13. The node of claim 11, where the communication and control circuitry configured to calculate a prediction of an ITB are further configured to calculate a predicted logical value that indicates whether an ITB is longer or shorter than the current ITB threshold.

14. The node of claim 11, wherein the current ITB threshold has a value that minimizes a sum of an average RRC state transition cost for predicted ITB values that are shorter than the current ITB threshold and an average RRC state transition cost for predicted ITB values that are longer than the current ITB threshold.

15. The node of claim 14, wherein:
the average RRC state transition cost for predicted ITB values that are shorter than the current ITB threshold is proportional to the fraction of short predictions that are correct and proportional to the fraction of short predictions that are false, and
the average RRC state transition cost for predicted ITB values that are longer than the current ITB threshold is proportional to the fraction of long predictions that are correct and proportional to the fraction of long predictions that are false.

16. The node of claim 11, wherein the communication and control circuitry are further configured to:
calculate an updated value for the current ITB threshold at regular instants in time, the instants in time being defined by any of:
a specific number of recorded ITB values,
a specific number of seconds.

17. The node of claim 16, wherein the communication and control circuitry are further configured to calculate at least one updated value for an RRC state transition cost.

18. The node of claim 11, wherein the communication and control circuitry are further configured to calculate an updated value for the current ITB threshold at instants in time, the instants in time being determined in dependence of an analysis of content of the data bursts.

19. The node of claim 11, wherein:
the communication and control circuitry configured to calculate a prediction of an ITB are further configured to calculate a prediction of an ITB between data bursts to be transmitted from the node to the wireless terminal, and
the communication and control circuitry configured to detect that a data burst is to be handled are further configured to detect that a data burst is to be transmitted from the node to the wireless terminal.

20. The node of claim 11, wherein:
the communication and control circuitry configured to calculate a prediction of an ITB between data bursts to be handled are further configured to calculate a prediction of an ITB between data bursts to be received from the wireless terminal, and
the communication and control circuitry configured to detect that a data burst is to be handled are further configured to detect that a data burst is to be received from the wireless terminal.

21. A non-transitory computer-readable medium comprising, stored thereupon, software instructions that, when executed in a processor in a node for controlling transitions between radio resource control (RRC) states for a wireless terminal in a radio access network, the radio resource control states comprising a first state and a second state, causes the processor to:
calculate a prediction of an inter-arrival time (ITB) between successive data bursts to be handled;
detect that a data burst is to be handled;
decide whether to make a transition from the first state to the second state upon termination of handling of the detected data burst if the prediction of the ITB is greater than a current ITB threshold, wherein
the current ITB threshold is a time interval that is determined based on a fractional distribution of true predictions and false predictions made for a plurality of ITB values using a prediction algorithm in relation to ITB values recorded for the plurality of ITB values; and
direct the wireless terminal either to remain in the first state or switch to the second state in accordance with the decision.

\* \* \* \* \*